Sept. 22, 1942.　　　C. W. INGELS　　　2,296,674
SUPPORT FOR CAMERAS OR THE LIKE
Filed Sept. 7, 1939
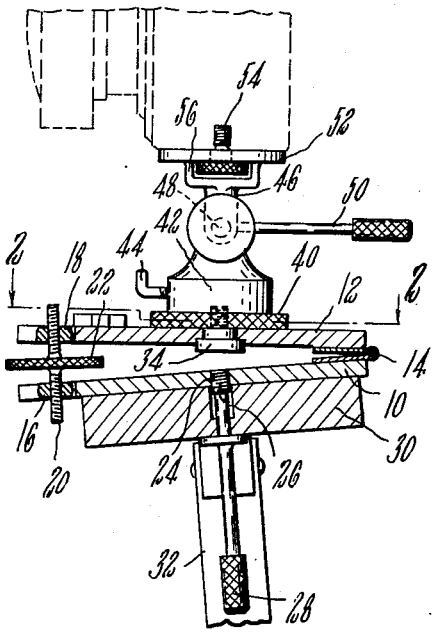
Fig. 1.
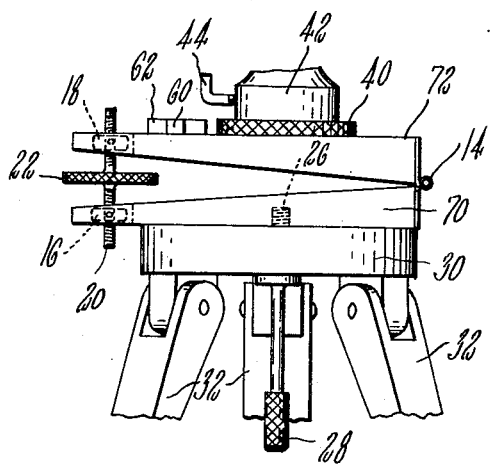
Fig. 3.
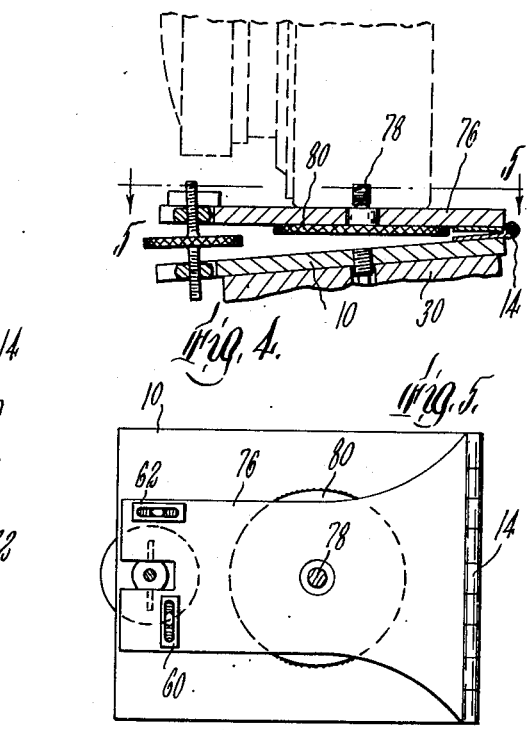
Fig. 2.
Fig. 4.
Fig. 5.
Inventor
Clarence W. Ingels
by Wright, Brown, Quinby + May
Attys Patented Sept. 22, 1942

2,296,674

UNITED STATES PATENT OFFICE 2,296,674

SUPPORT FOR CAMERAS OR THE LIKE

Clarence W. Ingels, St. Albans, N. Y.

Application September 7, 1939, Serial No. 293,655

6 Claims. (Cl. 248—180)

This invention relates to supporting and leveling means for instruments such as cameras.

When taking photographs, it is desirable that the horizontal lines in the subject which is photographed appear horizontally in the finished picture and that tilting of the subject in the picture be avoided. Since it is often necessary to set up a tripod on rough or irregular surfaces to support a camera for picture taking, it is often troublesome to adjust the legs of the tripod so that the camera will be reasonably level.

It is an object of the present invention to provide simple but effective means for leveling the camera quickly and easily regardless of the inclination of the top of the tripod when the tripod is set up.

The invention consists principally of a pair of members which are attachable to a tripod and which are hinged together so that the upper member is adjustably rockable relatively to the lower. If desired, a panorama device may be mounted on the upper member, the camera or equivalent instrument being mounted on the panorama device so that it can be swung about a vertical axis and may also be tilted up or down about an axis which is perpendicular to the vertical axis. With the panorama device, pictures may thus be taken in any direction and at any angle of forward inclination of the camera without any tilting of the subject in the resultant picture.

For a more complete understanding of the invention, reference may be had to the description thereof which follows and to the drawing of which Figure 1 is a side elevation, partly in section, of an embodiment of the invention.

Figure 2 is a section on the line 2—2 of Figure 1.

Figure 3 is a side elevation of a modified form of the invention.

Figure 4 is a sectional view, taken on a vertical plane, of another modified form of the invention.

Figure 5 is a section on the line 5—5 of Figure 4.

The leveling device shown on the drawing may consist principally of a pair of plates 10 and 12 which are hinged together by a hinge 14 which extends along one side edge of the plates. At a suitable point remote from the axis of the hinge I provide means for rockably adjusting the top plate 12 to and from the bottom plate 10. As shown, such means comprises a pair of trunnion nuts 16 and 18 mounted in the plates 10 and 12 respectively near the edges of the plates opposite the hinge 14. These nuts are in alinement with each other and are in threaded engagement with a right and left hand screw 20. A suitable finger wheel 22 is fixed to the screw for manipulation thereof. Rotation of the screw in one direction or the other results in rocking movement of the plate 12 about the axis of the hinge 14 toward or from the plate 10. The screw holds the plates in any position of mutual adjustment.

The bottom plate is preferably provided with a central aperture 24 which is threaded to receive a screw 26 rotatable by a handle 28 to secure the plate 10 against the top surface of the top or platform 30 of a tripod. When the screw 26 is loosely engaged in the aperture 24, the plate 10 may be rotatively adjusted about the axis of the tripod. When the screw is set up tightly, the plate is frictionally locked against rotative adjustment with respect to the top 30. As shown, the tripod comprises the top 30 and three legs 32, which, if desired, may be telescopically adjustable in a manner well known in the art.

Fixed in the uper plate 12 is an upstanding screw 34 adapted to receive and secure a camera or other object having a threaded aperture which can be fitted on the screw. As shown in Figure 1, a panorama device may be mounted on the plate 12. This panorama device may include a base 40 having a central threaded recess adapted to receive the screw 34 so as to secure the base firmly against the top of the plate 12. If preferred, the base 40 may be made integral with the plate 12 instead of being separably attached thereto as shown. In either case, the hinged element 12 serves as a portion of the base of the panorama device. A standard 42 is rotatably mounted on the base 40 and is coaxial therewith, the axis of the base and standard being perpendicular to the top surface of the plate 12 when the panorama device is firmly secured in position on the plate. A set-screw 44 is provided to lock the standard against rotation relative to the base. An extension 46 is mounted on the standard 42 and is normally coaxial therewith. This extension is rockable about an axis 48 which is perpendicular to the axis of the standard. The extension 46 is provided with an operating lever 50 which projects laterally therefrom and which may be manipulated to rock the extension about the axis 48. The operating lever 50 is provided with a threaded end (not shown) by rotation of which the extension may be locked in any position of adjustment about the axis 48. The lever 50 can also be employed to swing the standard about its vertical axis when the locking screw 44 is released. The upper end of the extension 46 is provided with a platform 52 through which a screw 54 projects to receive a camera and is rotatable by a knurled disc 56 to secure the camera firmly against the top face of the platform 52. The screw 54 is coaxial or at least parallel with the extension 46, so that when a camera is secured on the platform 52 its focal axis will be perpendicular to the plane defined by the axis 48 and the axis of the screw 54.

In order to level a camera mounted on the device shown, it is necessary to adjust the device so that the top surface of the plate 12 will be horizontal, or, in other words, the axis of the standard 42 must be vertical. For this purpose, a pair of spirit levels 60 and 62 are preferably provided. The level 60 is mounted on the base of the panorama device or on the plate 12 if the device is separable therefrom. This level is in either case fixed in a position parallel to the axis of the hinge 14. The level 62 is perpendicular to the level 60 if mounted in the same plane therewith as indicated in Figure 1. The level 62 must be so mounted with respect to the standard 42 that it lies in two planes which are perpendicular respectively to the axes of the hinge 14 and of the standard 42.

The operation of the foregoing mechanism is as follows. The leveling device is secured to the tripod platform 30 by means of the attaching screw 26. The tripod is then set up and the device is rotatively adjusted about the axis of the screw 26 until the spirit level 60 which is parallel to the axis of the hinge 14 shows that the hinge axis is horizontal. The screw 26 is thereupon set up tightly to retain the hinge axis in its horizontal position. The plate 12 is thereupon rocked by manipulation of the finger piece 22 until the level 62 shows that the plate or base is horizontal. The axis of the standard will then be vertical, so that if the camera or other instrument has previously been secured to the screw 54 of the panorama device the camera will thereupon be in position for use.

Figure 3 shows a slight modification of the invention. Instead of flat plates 10 and 12 as illustrated in Figure 1, a pair of members 70 and 72 are employed such that, when their outer or mutually remote faces are parallel, their inner faces are spaced apart. These members are hinged together along one side edge of a hinge 14, being rockable toward or from each other by a right and left hand screw 20 which is in threaded engagement with a pair of trunnion nuts 16 and 18 mounted in the members 70 and 72 respectively near the edges remote from the hinge 14. The mutually remote faces of the members 70 and 72 are normally parallel. The inner faces of these members, however, diverge from the hinge 14 or are otherwise spaced so that the members can rock toward each other from their normal position. This is convenient in setting up the apparatus since in the initial adjustment of the leveling device on an inclined tripod top it may be adjusted to either of the two positions in which the hinge axis is horizontal, these positions being at the high side and low side of the tripod top. If the upper member can be rocked only upward from its normal position, then in the initial adjustment the hinge 14 would have to be at the high side of the tripod top.

If it is preferred to mount a camera directly on the leveling device, the latter may be made with an upper member 76 carrying an upright rotatable screw 78 which is operated by manipulation of a knurled disc 80. The upper member 76 is preferably cut away as indicated in Figure 5 to facilitate access to the knurled disc. By the use of the rotatable screw 78, a camera or other instrument may be mounted on the leveling device either before or after the upper member has been leveled, and may then be secured at any desired azimuth.

It is evident that various modifications and changes may be made in the particular embodiments of the invention herein shown and described without departing from the spirit or scope thereof as defined in the following claims.

I claim:

1. A leveling attachment for a camera tripod or the like, comprising a pair of plates hinged together at one side edge, adjusting means adjacent to the opposite side edge operable to change the angular relation between the plates and to hold the plates in adjusted relative positions, and a pair of spirit levels mounted on the upper face of the upper plate, one of said levels being parallel to the hinge axis, the other level being perpendicular to the first said level.

2. A leveling attachment for a camera tripod or the like, comprising a pair of plates hinged together at one side edge, alined trunnion nuts rockably mounted in said plates at points remote from the hinge, a right and left hand screw in threaded engagement with said nuts, and a pair of spirit levels mounted on the upper face of the upper plate, one of said levels being parallel to the axis of said hinge, the other level being perpendicular to the first said level.

3. A support for a camera or the like, comprising a plate adapted to be secured to the top of a tripod, a panorama device having a base hinged to said plate at a side edge thereof, said device also having a standard rotatably adjustable on said base about an axis in a plane perpendicular to the hinge, an extension on said standard normally coaxial with the standard but rockable thereon about an axis perpendicular to the axis of the standard, means on said extension for securing a camera or the like thereon, means for rockably adjusting the whole device about the hinge axis, and a pair of spirit levels mounted on said standard, one said level being parallel to the axis of the hinge, the other said level being in planes which are perpendicular respectively to the axis of the hinge and of said standard.

4. A leveling attachment for an unlevel supporting surface, which comprises a pair of members hinged together, means for attaching the lower of said members rotatively to said surface for rotative adjustment of said attachment about an axis perpendicular to said surface, said lower member being attached to said surface in such a manner that the axis of the hinge connecting said members is always parallel to said surface, the upper of said members having an upper surface parallel to the axis of said hinge, a level indicator mounted on said upper member and arranged to indicate when the axis of said hinge becomes horizontal as said attachment is rotated on said supporting surface, and a second level indicator mounted on said upper member and arranged to indicate when all the lines in said upper surface which are in planes perpendicular to the hinge axis become horizontal as the upper member is rocked on said hinge.

5. A leveling device attachable to an unlevel surface and rotatable about an axis perpendicular to said surface, said device comprising two members relatively rockable about a hinge axis, and means for indicating the positions of said device in which one of said members can be brought to a level position by rocking movement about said hinge axis.

6. A leveling device attachable to an unlevel surface and rotatable about an axis perpendicular to said surface, said device comprising two members relatively rockable about a hinge axis, means for indicating the positions of said device in which one of said members can be brought to a level position by rocking movement about said hinge axis, and means operative when the device is in one of said positions to indicate the level position of said one member.

CLARENCE W. INGELS.